US010673964B2

(12) United States Patent
Lewis et al.

(10) Patent No.: US 10,673,964 B2
(45) Date of Patent: Jun. 2, 2020

(54) APPLICATION PROGRAMMING INTERFACE FOR RENDERING PERSONALIZED RELATED CONTENT TO THIRD PARTY APPLICATIONS

(71) Applicant: Google LLC, Mountain View, CA (US)

(72) Inventors: Justin Lewis, South San Francisco, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 116 days.

(21) Appl. No.: 15/645,648

(22) Filed: Jul. 10, 2017

(65) Prior Publication Data

US 2017/0310771 A1   Oct. 26, 2017

Related U.S. Application Data

(63) Continuation of application No. 14/967,033, filed on Dec. 11, 2015, now Pat. No. 9,705,999, which is a
(Continued)

(51) Int. Cl.
*H04L 29/06* (2006.01)
*G06F 15/16* (2006.01)
(Continued)

(52) U.S. Cl.
CPC ........ *H04L 67/20* (2013.01); *G06F 16/24575* (2019.01); *G06F 16/9535* (2019.01);
(Continued)

(58) Field of Classification Search
CPC ......... H04L 67/20; H04L 67/16; H04L 67/22; G06F 17/30528; G06F 17/30867
(Continued)

(56) References Cited

U.S. PATENT DOCUMENTS 8,978,114 B1 *  3/2015  Kaushik .............. G06F 21/6218
                                                                                  726/2
9,219,945 B1 * 12/2015  Velummylum .... H04N 21/4622
(Continued)

OTHER PUBLICATIONS

Pablo Cesar; Usages of the Secondary Screen in an Interactive Television Environment: Control, Enrich, Share, and Transfer Television Content; Springer; p. 1-10 (Year: 2008).*
(Continued)

*Primary Examiner* — Monjur Rahim
(74) *Attorney, Agent, or Firm* — Byrne Poh LLP

(57) ABSTRACT

A system includes an ingestion component configured to receive a request from an entity for content related to a content item and a user identity. The request has a content identifier representative of the content item and a token. A request processing component of the system is configured to access a database associated with the system and identify the content item and the user identity using the content identifier and the token, wherein the database has information associating the token with the user identity and associating the content identifier with the content item. In response to identification of the content item and the user identity, the request processing component directs a recommendation engine associated with the system to identify the content related to the content item and the user identity. Information identifying the content related to the content item and the user identity is then transmitted back to the entity.

21 Claims, 9 Drawing Sheets

Related U.S. Application Data continuation of application No. 14/136,652, filed on Dec. 20, 2013, now Pat. No. 9,219,736.

(51) Int. Cl.
*G06F 7/04* (2006.01)
*H04L 29/08* (2006.01)
*G06F 16/9535* (2019.01)
*G06F 16/2457* (2019.01)

(52) U.S. Cl.
CPC ............ *H04L 63/102* (2013.01); *H04L 67/16* (2013.01); *H04L 67/22* (2013.01)

(58) Field of Classification Search
USPC .......................................................... 726/4
See application file for complete search history.

(56) References Cited

U.S. PATENT DOCUMENTS

| | | | |
|---|---|---|---|
| 2007/0088832 A1* | 4/2007 | Tsang | G06Q 10/00 709/227 |
| 2009/0235335 A1* | 9/2009 | Mendiola | H04L 63/104 726/4 |
| 2010/0257234 A1* | 10/2010 | Caughey | H04L 67/306 709/203 |
| 2011/0093329 A1 | 4/2011 | Bodor et al. | |
| 2011/0107433 A1* | 5/2011 | Steelberg | G06Q 30/02 726/27 |
| 2011/0125585 A1 | 5/2011 | Dow et al. | |
| 2011/0225417 A1 | 9/2011 | Maharajh et al. | |
| 2011/0276993 A1* | 11/2011 | Ferguson | H04N 7/173 725/30 |
| 2011/0289534 A1* | 11/2011 | Jordan | H04N 7/17318 725/48 |
| 2012/0215684 A1 | 8/2012 | Kidron | |
| 2012/0317136 A1 | 12/2012 | Papish et al. | |
| 2013/0036016 A1* | 2/2013 | Pattan | H04L 67/20 705/14.73 |
| 2013/0036191 A1* | 2/2013 | Fink | G06F 17/30905 709/217 |
| 2013/0110992 A1 | 5/2013 | Ravindra et al. | |
| 2013/0124652 A1* | 5/2013 | Kim | H04L 51/32 709/206 |
| 2013/0139191 A1 | 5/2013 | Ren | |
| 2014/0074639 A1* | 3/2014 | Tian | G06Q 30/0631 705/26.1 |
| 2014/0223099 A1* | 8/2014 | Kidron | G06F 12/0806 711/118 |
| 2014/0223488 A1* | 8/2014 | Korst | H04N 21/4668 725/53 |

OTHER PUBLICATIONS

Kamvar et al., "A Large Scale Study of Wireless Search Behiavor: Google Mobile Search", In Proceedings of the SIGCHI Conference on Human Factors in Computing Systems, Montreal, CA, Apr. 24-27, 2006, pp. 701-709.
Office Action dated Feb. 16, 2016 in U.S. Appl. No. 14/967,033.
Office Action dated May 7, 2015 in U.S. Appl. No. 14/136,652.
Office Action dated Aug. 18, 2016 in U.S. Appl. No. 14/967,033.
Office Action dated Dec. 22, 2016 in U.S. Appl. No. 14/967,033.
Zhang et al., "Personalized TV Program Recommendation based on TV-Anytime Metadata", In Proceedings of the Ninth International Symposium on Consumer Electronics, Macau, CN, Jun. 14-Jun. 16, 2005, pp. 242-246.
Notice of Allowance dated Mar. 10, 2017 in U.S. Appl. No. 14/967,033.
Notice of Allowance dated Aug. 18, 2015 in U.S. Appl. No. 14/136,652.

* cited by examiner

US 10,673,964 B2

APPLICATION PROGRAMMING INTERFACE FOR RENDERING PERSONALIZED RELATED CONTENT TO THIRD PARTY APPLICATIONS

CROSS-REFERENCE TO RELATED APPLICATIONS

This application is a continuation of U.S. patent application Ser. No. 14/967,033, filed Dec. 11, 2015, which is a continuation of U.S. patent application Ser. No. 14/136,652, filed Dec. 20, 2013, each of which is hereby incorporated by reference herein in its entirety.

TECHNICAL FIELD

This application generally relates to systems and methods for using an application programming interface to provide information identifying personalized related content to third party applications.

BACKGROUND

Application programming interfaces (APIs) facilitate communication allowing different applications to communicate effectively with each other. It is a common practice for networked systems to expose part of their functionality or data as an API to others systems and applications via a connecting network (e.g., the Internet). This allows the systems and applications to tap into functionally and data provided by the respective systems, combine it with what they offer and provide improved and added functionality to their users.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
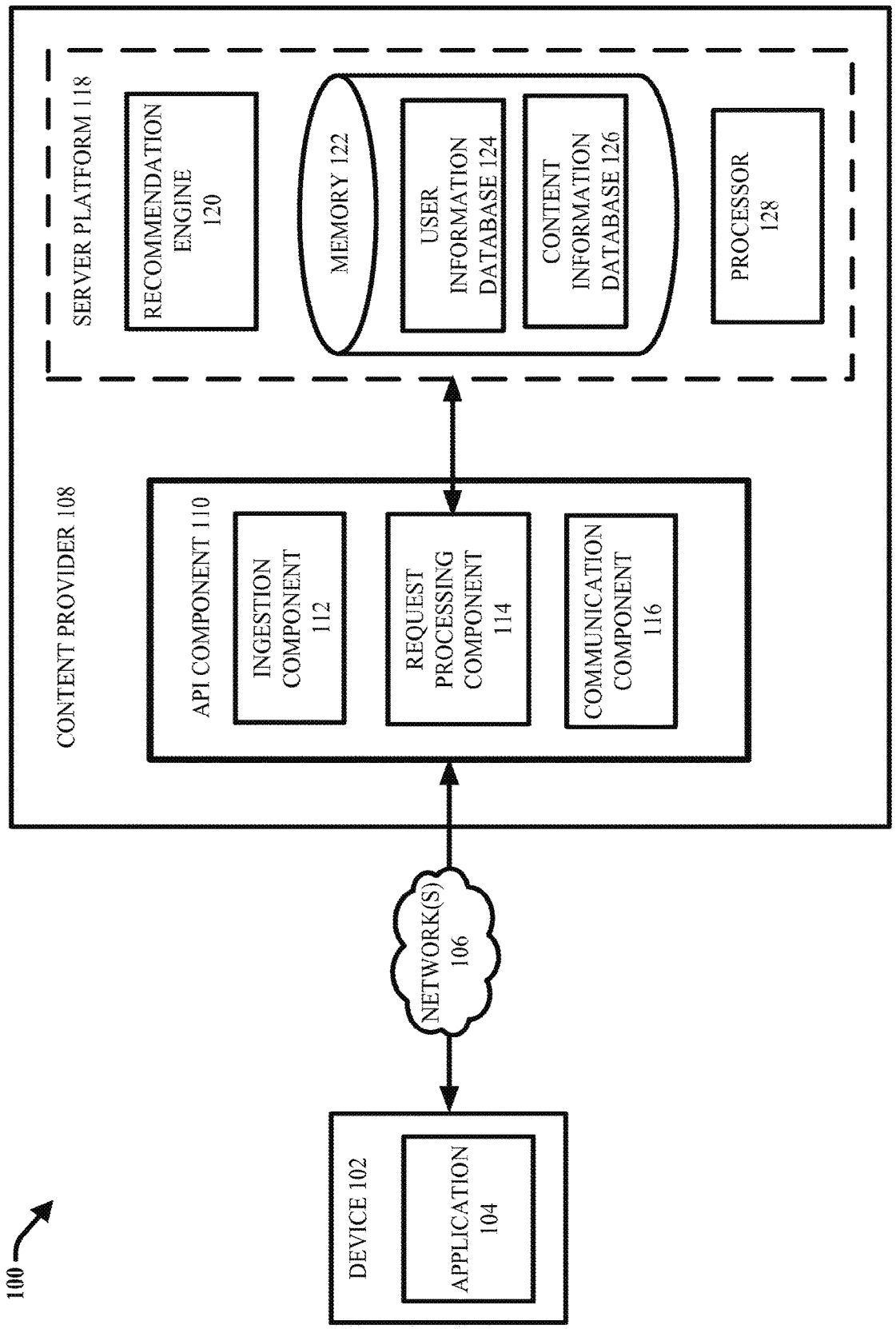
FIG. 1 illustrates an example system using an API to provide information identifying personalized related content to third party applications in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter of this disclosure relates to an application programming interface (API) for accessing, by a third party application, a content server via a network to receive information identifying content items, provided by the content server, that are related to a content item identified by the third party application and a user identified by the third party application. In general, an API is the interface implemented by an application which allows other applications to communicate with it. An API defines a language and message format used by an application program to communicate with the operating system or some other control program such as a database management system (DBMS) or communications protocol. The language and messaging format of a system's API can be made available to third party applications to enable the third party applications to interface with the system and employ the various operating systems, information databases, and/or control programs provided by the system.

The subject disclosure relates to an API that allows third party applications to interface with a content provider via a network (e.g., the Internet) to exploit various features and functionalities provided by the content provider. In particular, the subject API defines a mechanism via which third party applications can request, from the content provider, information identifying and/or describing content items related to another content item and a specific user. The API is configured to receive, interpret, and process such requests (also referred to herein as API calls) and direct the content provider to generate the information using information, services, and applications associated with the content provider. The API can further return the generated list and/or description of content items to the application or entity associated with the request.

In an aspect, an API associated with a content provider receives an API call from a third party application for information identifying content items related to another content item and personalized to the preferences of a specific user. In association with the API call, the API ingests an identifier for a content element (e.g., a video identifier) and a unique user identifier. The API processes the API call and returns to the third party application, a set of content element identifiers and metadata for the associated content elements based on the content element identifier and the unique user identifier. In an aspect, the unique user identifier is embodied in a token which represents the unique pairing of the third party application (e.g., via a third party application identifier) and the user's unique identifier.

When processing the API call, the API employs a server side (associated with the content provider) look up table to map the token to the unique user identifier to identify the user represented by the identifier as known to the content provider. After the user is identified, information related to the user can be retrieved (e.g., preference information, historical data regarding user interaction with the content provider, demographic information, etc.) and employed to generated a personalized list of related content. For example a set of content items can be identified that are related to the content item represented by the content identifier. This set of content items can then be filtered to remove content items the user has previously accessed. The set of content items can further be adapted to promote content items that the users sharing similar characteristics of the user have accessed or endorsed.

In one or more aspects, a system is provided that includes an ingestion component configured to receive a request from an entity for content related to a content item and a user identity. The request has a content identifier representative of the content item and a token. A request processing component of the system is configured to access a database associated with the system and identify the content item and the user identity using the content identifier and the token, wherein the database has information associating the token with the user identity and information associating the content identifier with the content item. In response to identification of the content item and the user identity, the request processing component directs a recommendation engine associated with the system to identify the content related to the content item and the user identity. Information identifying the content related to the content item and the user identity is then transmitted back to the entity.

In another aspect, a method is disclosed that includes receiving at an API associated with a system, a request for content related to a content item provided by the system and a user identity, the request comprising a content identifier representative of the content item and a token comprising a user identifier representative of the user identity. The method further includes, accessing by the API, a database associated with the system comprising information associating the token with the user identifier and information associating the content identifier with the content item, identifying by the API, the content item and the user identity using the information in the database. Further, in response to the identifying the content item and the user identity, the method includes directing, by the API, a recommendation engine associated with the system to identify the content related to the content item and the user identity, and sending by the API, a response to the request comprising information identifying the content related to the content item and the user identity to an entity associated with the request.

Still in yet another aspect, provided is a tangible computer-readable storage medium comprising computer-readable instructions that, in response to execution, cause a computing system to perform various operations. These operations include, receiving by a system via a network, a request for content related to a content item provided by the system and a user identity, the request comprising a content identifier representative of the content item and a token comprising information representative of the user identity. These operations further include, accessing a database associated with the system comprising information associating the token with the user identity and information associating the content identifier with the content item, identifying the content item and the user identity using the information in the database, in response to the identifying the content item and the user identity, directing a recommendation engine associated with the system to identify the content related to the content item and the user identity, and sending via the network, a response to the request comprising information identifying the content related to the content item and the user identity.

Referring now to the drawings, with reference initially to FIG. 1, presented is a diagram of an example system 100 for using an API to provide, by a content provider, information to a third party application identifying content items, provided by the content provider, related to a content item and a user identified by the third party application, in accordance with aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device (s), virtual machine(s), etc. can cause the machine(s) to perform the operations described.

System 100 includes content provider 108 including API component 110 and server platform 118, and a device 102 employing an application 104 configured to access features and information associated with server platform 118 via a network 106 using API component 110. For example, content provider 108 can include a media provider configured to store and provide streaming videos to a plurality of users. In association with streaming media services provided by content provider 108, content provider 108 can include server platform 118 that provides the functionality to identify videos, provided by content provider 108, for recommending to a user for viewing based on various factors including learned or known user preferences. In an aspect, content provider 108 can allow third party applications (e.g., application 104) to exploit this video recommendation functionality of server platform 118 using API component 110 to request and receive a list of recommended media content based on a user identified by the application 104 and a media item identified by the application 104. Content provider 108 can include memory 122 for storing computer executable components and instructions and processor 128 to facilitate operation of the instructions (e.g., computer executable components and instructions) by content provider 108.

Content provider 108 can include a variety of entities configured to provide content or content items to a user at a client device via a network 106 (e.g., the Internet) and that includes functionality (e.g., software and hardware) to identify and filter content items provided by the content provider 108 (e.g., using various algorithms employed by the content provider) based on relationships between the content items and other content items and relationships between the content items and a specific user. For example, content provider 108 can include a website or application configured to present pictures, articles, blogs, videos, or other types of content items to users, and configured to identify tailored subsets of the pictures, the articles, the blogs, the videos, etc., for recommending to the respective users based in part on learned preferences of the respective users. According to this example, the content provided by the website or application can be configured for downloading, streaming or merely viewing at a client device via a network 106.

As used herein, the term content item refers to any suitable data object that can be linked to and accessed or otherwise shared via a network and includes but is not limited to: documents, articles, messages, webpages, programs, applications, and media items. In an aspect, a content item includes a data object that can be identified by a URL. The term media content or media item can include but is not limited to: video, live video, animations, video advertisements, music, music videos, sound files, pictures, and thumbnails. In some aspects, the term media content or media item includes a collection of media items, such as a playlist including several videos or songs or a channel.

A channel can be data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

In an exemplary embodiment, content provider 108 includes a streaming media provider configured to provide streamed media to client devices (e.g., client device 102) over a network 106. The media can be stored in memory associated with the media provider (e.g., memory 122) and/or at various servers employed by the media provider and accessed by client devices using a networked platform (e.g., a website platform, a cellular application) employed by the media provider. For example, the media provider can provide and present media content to a user via a website that can be accessed by a client device using a browser. In another example, the media provider can provide and present media to a user via a mobile/cellular application provided on a client device (e.g., where client device is a smartphone or the like).

In association with providing content to users via a network (e.g., streaming media where content provider is a media provider), content provider 108 can have access to rich information about the respective users of content provider 108. This rich information can be employed by content provider 108 (and more particularly server platform 118 discussed supra) to identify personalized content recommendations for the respective users. For example, the users can establish accounts or profiles with the content provider 108 and associate information related to their particular content preferences (e.g., type of content, genera of content, length of content, source of content, language of content, or other characteristics of the content) with their respective profiles. User profiles can also provide other information about a specific user, either provided by the user or learned by the content provider 108, and associated with the user's profile or identity. For example, where content provider 108 is a streaming media provider, a user's profile can provide a variety of personalized information about the user, including but not limited to: demographic information, historical data regarding user interaction with the media provider and media provided by media provider (e.g., video watch history, media sharing history, information indicating media endorsed or subscribed to by the user, information indicating media commented on my the user, information indicating media favorited by the user, etc.), user location information, user context information, and social affiliations of the user (e.g., relationships between the user and other users).

Device 102 can include any suitable computing device that includes an application 104 configured to access information and services provided by content provider 108 via a network 106 using API component 110. For example, client device 102 can include a desktop computer, a laptop computer, a television, an Internet television, a mobile phone, a smartphone, a tablet personal computer (PC), or a personal digital assistant (PDA). Application 104 can include software (embodied in a program, module, component, or other type of computer readable medium configured to perform API calls as described herein) configured to provide a program or task to an end user. In an aspect, application 104 is configured to provide an end user task based on a set of one or more content items identified and recommended by content provider 108 that are personalized for the end user. For example, application 104 can be configured to present a user with a list of recommended content items related to another content item and preferences of the user. In another example, application 104 can be configured to present a user with additional information based on information identifying a set of recommend content items. Application 104 is referred to herein as a third party application in the sense that application 104 represents a program (e.g., software) that is not internal to or running at content provider 108. On the contrary application 104 can be configured to interface with content provider 108 using API component 110 to request and receive information provided by and processed by server platform 118.

As used in this disclosure, the terms "content consumer" or "user" refer to a person, entity, system, or combination thereof that employs system 100 (or additional systems described in this disclosure) using a client device 102. The one or more networks 106 via which one or more components of system 100 can connect can include wired and wireless networks, including but not limited to, a WAN (e.g., the Internet or a cellular network), a local area network (LAN) or a personal area network (PAN). For example, device 102 can communicate with content provider 108 and API component 110, (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

API component 110 is configured to receive and service API calls from applications (e.g., application 104) for information provided by content provider 108 relating to a content item and a user identity. API component 110 provides the interface for controlling access, by another application via a network 106, to various applications, systems, and/or information provided by content provider 108. In particular, API component 110 allows a third party application to communicate with content provider 108 and exploit features and functionalities of server platform 118.

Server platform 118 is configured to access a variety of information stored by content provider 108 (e.g., in memory 122) or at another device accessible to content provider 108, that can be used to identify, filter, and recommend a subset of content items, provided by content provider 108, to a user based at least in part on a learned or inferred preference of the user. Server platform 118 can include recommendation engine 120 to identify content items (e.g., using various algorithms stored by or accessible to content provider 108) provided by content provider 108 for recommending to a user based on a variety of factors personalized to the user, including but not limited to: demographics of the user, declared preferences of the user, inferred preferences of the user, historical data regarding user interaction with the content provider, historical data regarding user interaction with content items provided by content provider, information regarding user sharing of content items provided by content provider (e.g., to another user, device, or source), information regarding user commenting on content items provided by content provider 108, and information regarding social affiliations between the user and other users. For example, where content provider 108 is a media provider, recommendation engine 120 can be configured to identify media items for recommending to a user based on age of the user, gender of the user, genera of media the user prefers, artists the user prefers, similarity of media items to a media item previously viewed or endorsed by the user, similarity of media items to a media item viewed or endorsed by another user having similar interest as the user, etc.

In an aspect, recommendation engine 120 can access user information database 124 to retrieve information associating user identities with personalized information for the respective user identities that can be used by recommendation engine 120 to identify subsets of content items provided by content provider 108 that are personalized to the respective user identities. For example, user information database 124 can store account or profile information for users of content provider 108 that have established accounts or profiles with content provider. The respective profile information of the various users can also be associated with historical user data regarding user activity at content provider and/or with content items provided by content provider, including links to content items provided by content provider at external sources. For example, where content provider 108 is a media provider, respective user profiles can be associated with watch history information that includes historical data regarding respective videos the users watched, when they were watched, where they were watched, etc.

In an aspect, API component 110 is a server-side web API. When used in the context of web development, an API is typically defined as a set of hypertext transfer protocol (HTTP) request messages, along with a definition of the structure of response messages, which is usually in an extensible markup language (XML) or JavaScript object notation (JSON) format. For example, application 104 can accesses API component using HTTP requests like GET or POST. API component 110 can processes these requests and transfer data stored by content provider 108 back and forth between application 104 and content provider 108 over the wire in the form of data feeds. The data feeds are simply structured lists that contain the data. Historically, the primary feed format has been AtomPub XML, but JSON and other formats can be employed. However, it should be appreciated that API component 110 can be configured to receive and process API calls in a variety of formats and programming languages.

API component 110 includes ingestion component 112 to ingest or receive API calls from and application 104, request processing component 114 to process API calls ingested by ingestion component 112 and communication component to return a response to application 104 with information requested in the API call (e.g., in the form of a data feed). In an aspect, ingestion component 112 is configured to ingest API calls that request information identifying one or more content items related to another content item and a particular user. These API calls or requests are referred to herein as personalized related content requests.

API component 110 can define information to be included in a personalized related content request sent by a third party application 104 to API component 110 that enables API component to process the request. In particular, API component 110 can require a personalized related content request to include at least a content identifier and a user identifier. The content identifier can identify a particular content item provided by content provider 108 and the user identifier can identify a specific user identity (e.g., where only one version of the user identity exists). For example, the content identifier can identify the video entitled "Man on the Run," and the user identifier can identify user John Smith. The form and language of the object identifier and user identifier can vary. For example, the respective identifiers can include a string of unique characters (e.g., text, numbers, symbols, etc.) that uniquely identify the content time and the user identity, respectively. However, the respective identifiers must be known to content provider 108 in order for API component 110 to process the API call.

For example, using the unique identifiers, request processing component 114 can employ information stored at content provider 108 (e.g., a look up table in memory 122) that relates the respective identifiers to a known content item and a known user identity. According to this example, server platform 118 can include user information database 124 that stores information relating user identifiers to respective user identities (e.g., respective user names, user profiles, user accounts). In an aspect, the user information database 124 (and/or another data store accessible to content provider 108) can further associate personalized user information (e.g., preferences, demographics, watch history, social relationships) with the respective user identities. Server platform 118 can also include content information database 126 that includes information associating content item identifiers with the respective content items represented by the content identifiers. In an aspect, the content information database 126 can also associate a variety of metadata and descriptive information with the respective content items.

After identifying the content item and the user identity using the respective identifiers, request processing component 114 can direct recommendation engine 120 to perform a query for content items related to the identified content item and user identity. For example, recommendation engine 120 can employ various algorithms (e.g., stored in memory) that filters content items provided by content provider 108 to identify a subset (e.g., one or more) of the content items based on similarities of the respective subset of content items to the content item identified in the API call and based on unique characteristics associated with the user identity (e.g., learned or inferred preferences, demographics, social affiliations, history of interaction with content provider, etc.). Recommendation engine 120 and/or request processing component 114 can further generate a personalized related content request response that includes information identifying the subset of content items and/or metadata associated with the respective content items. Communication component 116 can further send or transmit the personalized related content request response back to the requesting application 104.

In an aspect, the user identifier provided in a personalized related content request/API call is represented in a unique token. Information identifying the token and relating the token to a specific user identity can further be stored in a data store (e.g., user information database 124 or another data store) accessible to server platform 118. According to this aspect, the request processing component 114 can employ the token received in the API call and the information stored or accessible to server platform 118 relating the token to the user identity to identify the user identity associated with the API call. Request processing component 114 can then direct recommendation engine 120 to identify content related to the content item and the user identity in response to identification of the user identity associated with the received token (e.g., based on matching of the token received with the API request and the information identifying the token stored by content provider 108).

According to this aspect, the token can represent a unique pairing between the user identity and the application 104 or entity from which the personalized related content request was received. Thus the token cannot be shared or employed by another entity or application to perform the same personalized related content request (e.g., wherein same refers to same as a function of the type of request and the content item and user identity associated with the request). For example, the token can also include or represent an application identifier that identifies the application or entity from which a request was received. In an aspect, request processing component 114 is configured to direct recommendation engine 120 to identify the content related to the content item and the user identity in response to a determination, based on the application/entity identifier, that the application/entity has been authorized to receive the information. This authorization information can be associated with the information identifying the token stored at content provider 108 or disassociated with the information identifying the token.

In addition to an application/entity identifier, request processing component 114 can also require proof of a secret key with a received API call. This can ensure that the application/entity identifier associated with the API call is not being fraudulently employed by another entity. According to this aspect, request processing component 114 can be configured to direct recommendation engine 120 to identify the content related to the content item and the user identity associated with the API call in response to a determination that the entity has been authorized to receive the information based on verification of the secret key by the content provider 108. This security can ensure restricted access of various third party applications to the subject API component 110 functionality and to protect against denial of service or distributed denial of service (DDOS) attacks.

In another aspect, the token provided in a personalized related content request received by ingestion component 112 can include session information associating the token with a session between the application/entity from which the request was received and content provider that has been authorized by the user identity. Thus the same token cannot be employed by another session between the application/ entity and the content provider. According to this aspect, the request processing component 114 can be configured to direct recommendation engine 120 to identify the content related to the content item and the user identity in response to a determination, based on the entity identifier and session information represented by and/or included in the token, that the entity has been authorized to receive the information.

Content items identified by a content item identifier in association with a personalized related content API request can vary based on the content provider. For example, the content item could include a picture, an article, a merchandise item or a video. In an aspect, where the content provider is a media provider, the content identifier can include an identifier for a video, a channel or a playlist. According to this aspect, a personalized related content API request would include a video identifier, a channel identifier, or a playlist identifier, respectively, and a unique user identifier. For example, where API component 110 receives a video identifier and a user identifier, API component can return information identifying videos that are related to the video identifier and that account for characteristics (e.g., preferences, watch history, etc.) of the user represented by the user identifier. In another example, where API component 110 receives a channel identifier and a user identifier, API component 110 can return information identifying videos that are provided on the channel represented by the channel identifier and that account for characteristics (e.g., preferences, watch history, etc.) of the user represented by the user identifier. In yet another example, where API component 110 receives a playlist identifier and a user identifier, API component 110 can return information identifying videos that included in the playlist represented by the playlist identifier and that account for characteristics (e.g., preferences, watch history, etc.) of the user represented by the user identifier.

In an aspect, request processing component 114 can direct recommendation engine 120 to identity content items related to a content item identified in a personalized related content request that are of the same type as the content item identified in the personalized related content request. For example, if the content item identified in a personalized related content request is a picture, request processing component 114 can direct recommendation engine 120 to identify other pictures related to the picture. However, in another aspect, request processing component 114 can direct recommendation engine 120 to identity content items related to a content item identified in a personalized related content request that are of various types. For example, if the content item identified in a personal related content request is a video, request processing component 114 can direct recommendation engine to identify related videos, related playlists, and/or related channels.

In an aspect, in addition to a content item identifier and a unique user identifier, a personalized related API call/request can include information defining other parameters for which to filter the requested related content. For example, the API call can request that information related to a content item and user identity be ranked based on popularity of the respective content items. According to this example, the API call can include a ranking parameter and a factor for which to base the ranking. In another example, the API call can request a specified number of content items to be identified in response to the request. For example, the API call can request the top X (where X is a number) content items most related to the content item identifier and user identifier.

Recommendation engine 120 can employ various algorithms and techniques to filter content items provided by content provider 108 based on relations of the content items to another content item and user identity identified in a personalized related content request. In an aspect, recommendation engine 120 can employ recommendation methods based on user bucketing. For example, recommendation engine 120 can first identify a set of content items provided by content provider 108 that are related to a content item identified in an API request. One mechanism for identifying this set of content items can include identifying other users that also have accessed or viewed the content item identified in the request. Recommendation engine 120 can then examine histories of these other users to identify a set of the content items that tend to be most commonly accessed and/or viewed by the respective users. The set of content items can further be normalized or ranked to account for respective popularity of the identified content items.

In an aspect, when personalizing this set of content item for the user identified in the API request, recommendation engine 120 can further examine the viewing history of the user and identify a group of other users with similar viewing histories. Recommendation engine 120 can compare the similar viewing histories of the respective users and identify a subset of content items that are most viewed and/or most commonly viewed by the respective users having similar viewing histories. This subset of content items can then be normalized to remove content items the user has already viewed. The subset of content items can also be ranked or ordered as a function of absolute (with respect to a large heterogeneous sample population) or relative (with respect to a grouped subset of the large heterogeneous sample population) popularity of the respective content items.

Figure 2:
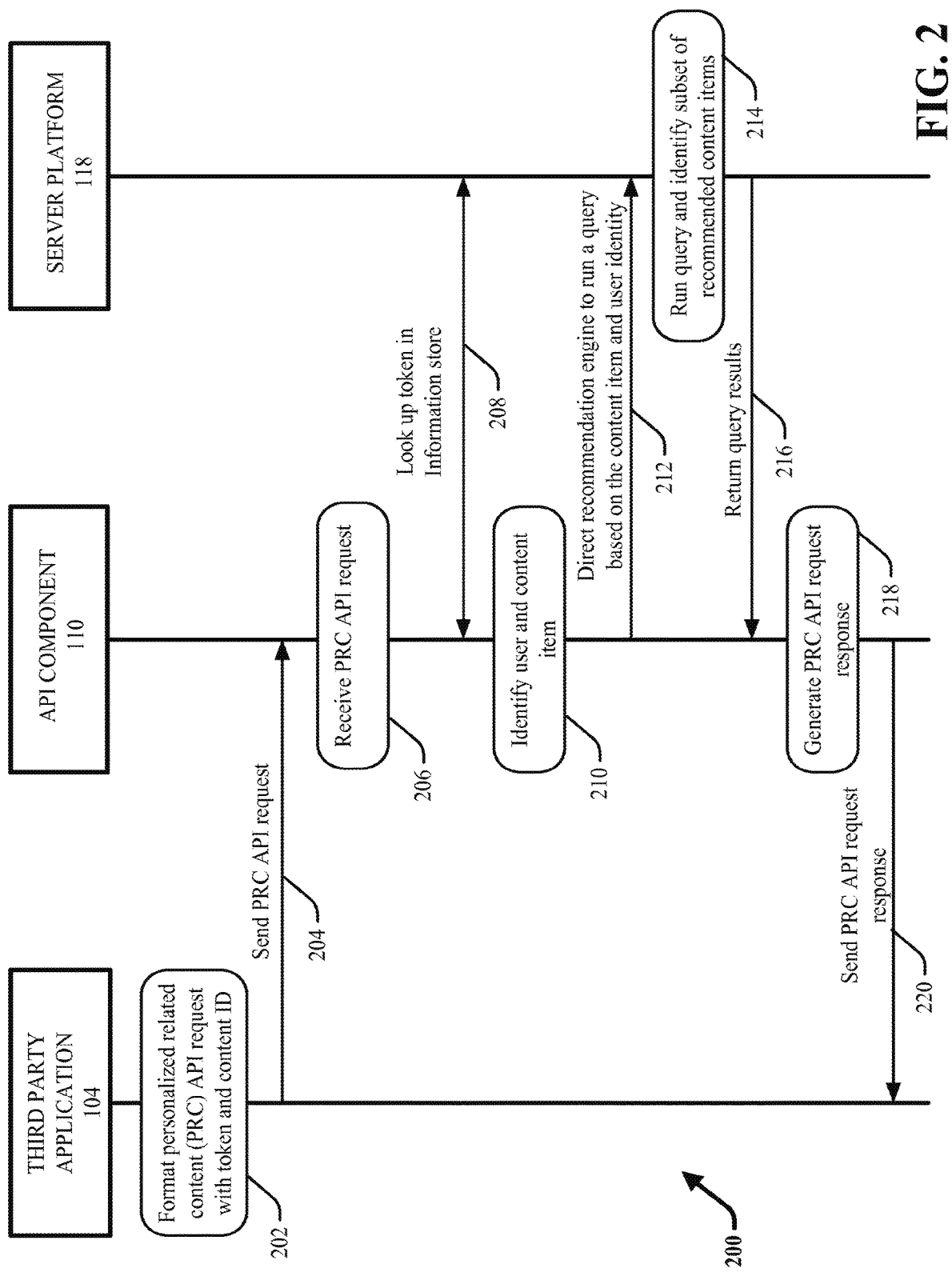
FIG. 2 presents a flow diagram of an example process for processing a personalized related content API request with respect to functions associated with a third party application, and API, and a content provider server platform, in accordance with aspects and embodiments described herein.

FIG. 2 presents a flow diagram of an example process 200 for processing a personalized related content API request with respect to functions associated with a third party application 104, an API component 110 and a content provider server platform 118, in accordance with aspects and embodiments described herein. Repetitive description of like elements employed in respective embodiments of systems and methods described herein are omitted for sake of brevity.

Process 200 begins with the third party application 104 formatting a personalized related content (PRC) API request at 202. For example the request can be formatted as an HTTP request message with information indicating a content item (e.g., content ID) and a user identity for which to base a query for related content items. The user identity can be embodied in a token having information representing an association of a unique user identifier and an identifier for the third party application. At 204, the third party application 104 sends the PRC API request to API component 110. At 206, the API component 110 receives the PRC API request. The API component 110 can further analyze the request to determine whether the request is formatted properly for processing by API component 110. For example, the API component 110 can determine whether the request includes a content ID and a token. Based in part on the presence of the content ID and the token, the API component can interpret the request as a PRC request. At 208 the API component 110 can look up the token in a data store associated with the content server platform 118. For example, the API component 110 can find the token in the data store. The token in the data store can further be associated with information identifying a user identity and an identification of the third party application. Thus at 210, using the received token, API component 110 can determine the identity of a user associated with the PRC request. API component can also identify the content item associated with the PRC request based on the content ID.

At 212, in response to identification of the user identity using the received token and the content item, API component 110 can direct a recommendation engine at the server platform 118 to run a query for content items related to the identified content item and user identity associated with the PRC API request. At 214, the server platform 118 can run the query and identify a subset of content items for recommending based on a relationship between the subset of content items and the content item and a relationship between the subset of the content items and the user identity (e.g., as determined or inferred using one or more algorithms employed by the recommendation engine). At 216, the recommendation engine of the server platform 118 can return the query results to the API component 110. At 218, the API component 110 can generate a PRC API request response based on the query results. For example, the API component 110 can generate a data feed (e.g., in XML or JSON) with information identifying the content items included in the query results. At 220, the API component 110 can send the PRC API request response back to the third party application 104.

Figure 3:
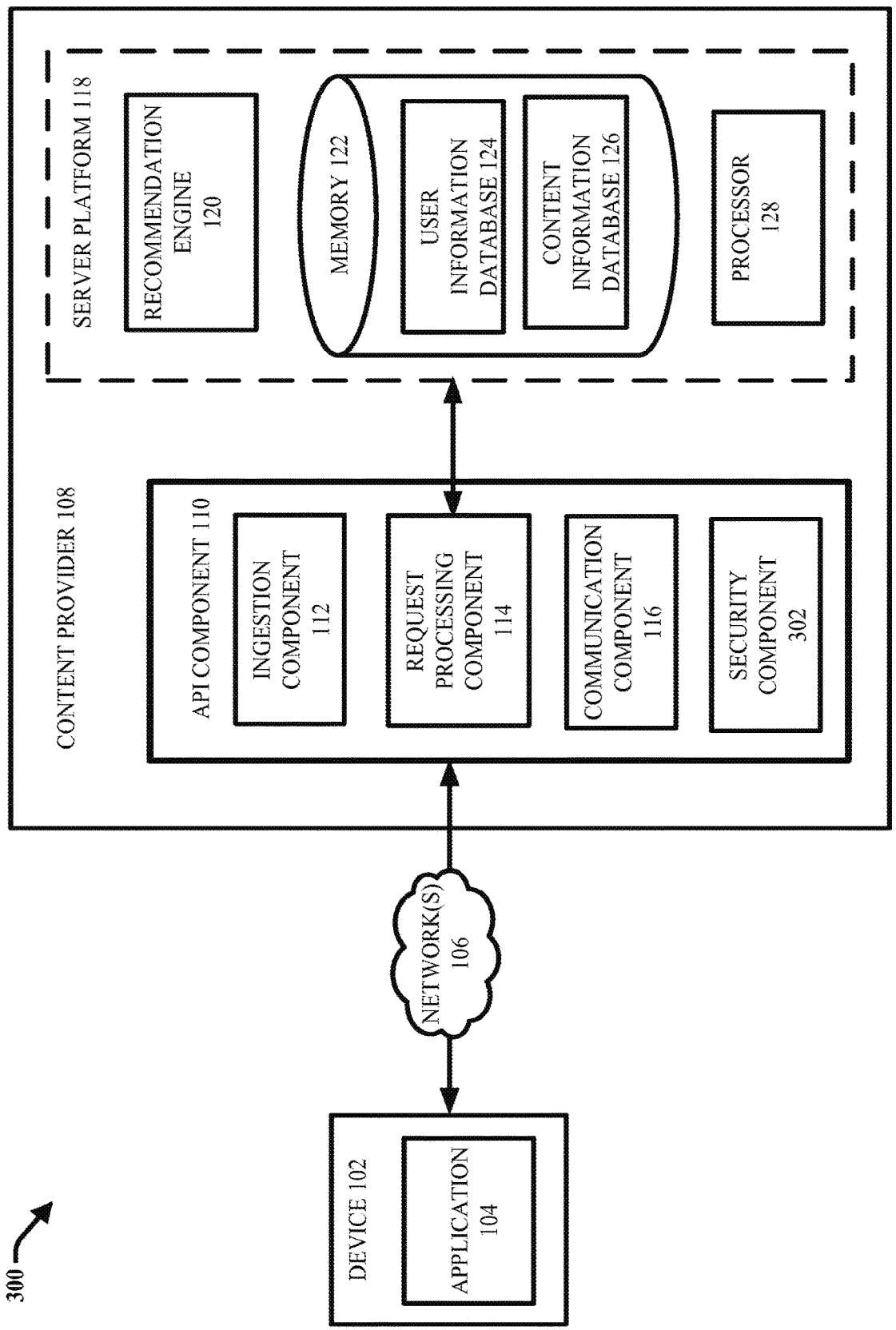
FIG. 3 illustrates another example system using an API to provide information identifying personalized related content to third party applications in accordance with various aspects and embodiments described herein.

FIG. 3 illustrates another example system 300 for using an API to provide, by a content provider, information to a third party application identifying content items, provided by the content provider, related to a content item and a user identified by the third party application, in accordance with aspects and embodiments described herein. System 300 is similar to system 100 with the addition of security component 302. Security component 302 is depicted as integral to API component 110. However, in one or more aspects, security component 302 can be associated with content provider 108 in general, server platform 118 and/or at an external system employed by content provider 108. Repetitive description of like elements employed in respective embodiments of systems and methods described herein are omitted for sake of brevity.

Security component 302 is configured to ensure that a user has authorized a third party application to access personal information associated with that user held at content provider. In addition, security component 302 is configured to manage access of server platform 118 and information associated with content provider by a third party application 104. In an aspect, security component 302 can implement an application and user verification/authorization process prior to allowing API component 110 to receive and process a personalized related content request from application 104 on behalf of a user. In accordance with the application and user verification/authorization process, security component 302 can receive an access request from the application 104 to access user information provided by the system related to a user identity. In response to the access request, security component 302 can request the third party application 104 provide authorization information associated with the user identity (e.g., username and password) and information identifying the third party application 104 (e.g., and application identifier (ID)).

Upon receipt of the user authorization information and application and application ID, security component 302 can verify the user and generate a token for the application that can be employed by the application 104 to issue a personalized related content request on behalf of the user. In an aspect, the token can include a unique string of characters (e.g., letters, numbers, and symbols) that represents the unique pairing between the application and the verified and authorized user. The token can also represent information that defines access parameters of the third party application (e.g., with respect to session time, what information the application is granted access to, etc.). Thus in an aspect, the token can only be employed by the application 104 in accordance with the access parameters represented by the token. For example, another third party application cannot use the token to issue a personalized related content request on behalf of the user. In another example, the third party application 104 can only user the token for the authorized session represented by the token between the application and the content provider 108.

Security component 302 is configured to associate the token in memory (e.g., memory 122) accessible to API component 110 and with the information represented by the token (e.g., user ID, application ID, application access parameters, etc.). Security component 302 further provides the token to the third party application for use in connection with a personalized related content request on behalf of the user. For example, when sending a personalized related content request to API component 110, third party application 104 can include the token and a content item ID in the request. Upon receipt of the request, API component 110 can look up the token in memory (e.g., memory 122) where the token is stored and associated with a user ID, an application ID and/or access parameters for the application. Where the token is a match and where the access parameters associated with the token allow API component 110 to process the request (e.g., a session represented by the token has not expired), API component 110 can identify the user identity associated with the user ID and instruct recommendation engine 120 to perform a recommendation query based on the user identity and the content item represented by the content ID.

Figure 4:
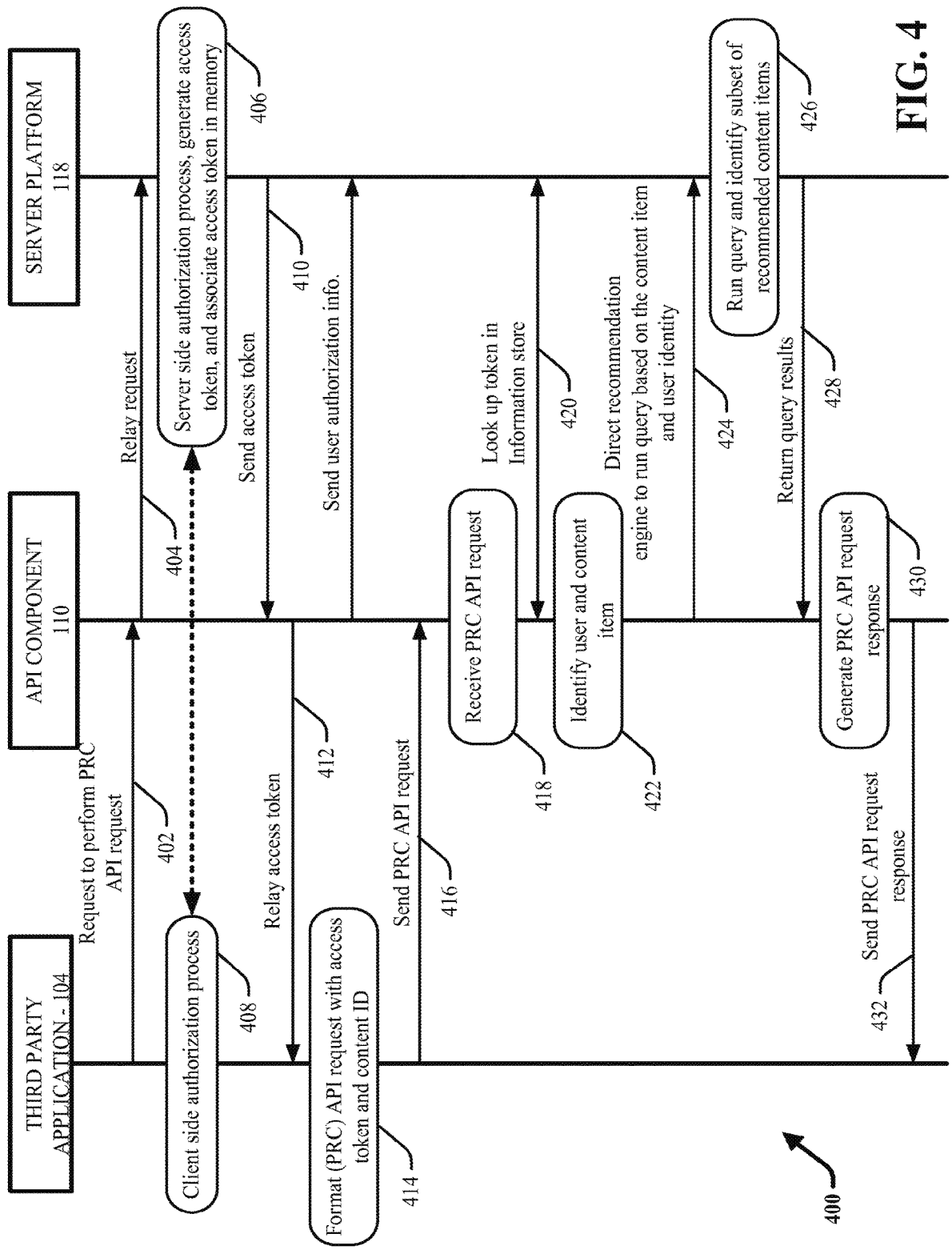
FIG. 4 presents a flow diagram of another example process for processing a personalized related content API request with respect to functions associated with a third party application, and API, and a content provider server platform, in accordance with aspects and embodiments described herein.

FIG. 4 presents a flow diagram of another example process 400 for processing a personalized related content API request with respect to functions associated with a third party application, an API and a content provider recommendation platform in accordance with aspects and embodiments described herein. Process 400 includes same or similar features as process 200. Repetitive description of like elements employed in respective embodiments of systems and methods described herein are omitted for sake of brevity.

Process 400 begins with at 402 a third party application 104 sending a request to API component 110 to perform a personalized related content (PRC) API request on behalf of a user. The request can include information identifying the user. At 404, API component 110 receives the request and relays the request to the server platform 118. At 406 and 408, the server platform 118 and the third party application perform a user verification and authorization process. For example, the server platform 118 can request the third party application provide (as received from the user), verification and authorization information (e.g., username and password) for the user identity. Upon receipt of the verification an authorization information and verification and authorization of the user identity, server platform 118 can generate an access token and associate the access token in memory. The access token can be associated with information pairing the user identity and the application identity. In another example, where the user has previously authorized the third party to access personal information provided at the server platform 118, server platform can determine that the third party application is authorized based on previously stored authorization information for the application and the user identity. The server platform can then issue a new access token for the third party application. At 410, the server platform can send the access token to the API component 110 and at 412; the API component can relay the access token to the third party application 104.

A 414 the third party application 104 formats a PRC API request that includes the access token and a content item ID. At 416, the third party application 104 sends the PRC API request to API component 110. At 418, the API component 110 receives the PRC API request. The API component 110 can further analyze the request to determine whether the request is formatted properly for processing by API component 110. For example, the API component 110 can determine whether the request includes a content ID and a token. In an aspect, based in part on the presence of the content ID and the token, the API component can interpret the request as a PRC request. At 420 the API component 110 can look up the token in the memory associated with the content server platform 118. For example, the API component 110 can find the token in the memory where it is associated with the information identifying the user identity and an identification of the third party application. Thus at 422, using the received token, API component 110 can determine the identity of a user associated with the PRC request. API component 110 can also identify the content item associated with the PRC request based on the content ID.

At 424, in response to identification of the user identity using the received token and the content item, API component 110 can direct a recommendation engine at the server platform 118 to run a query for content items related to the identified content item and user identity associated with the PRC API request. At 426, the server platform 118 can run the query and identify a subset of content items for recommending based on a relationship between the subset of content items and the content item and a relationship between the subset of the content items and the user identity (e.g., as determined or inferred using one or more algorithms employed by the recommendation engine). At 428, the recommendation engine of the server platform 118 can return the query results to the API component 110. At 430, the API component 110 can generate a PRC API request response based on the query results. For example, the API component 110 can generate a data feed (e.g., in XML or JSON) with information identifying the content items included in the query results. At 432, the API component 110 can send the PRC API request response back to the third party application 104.

Figure 5:
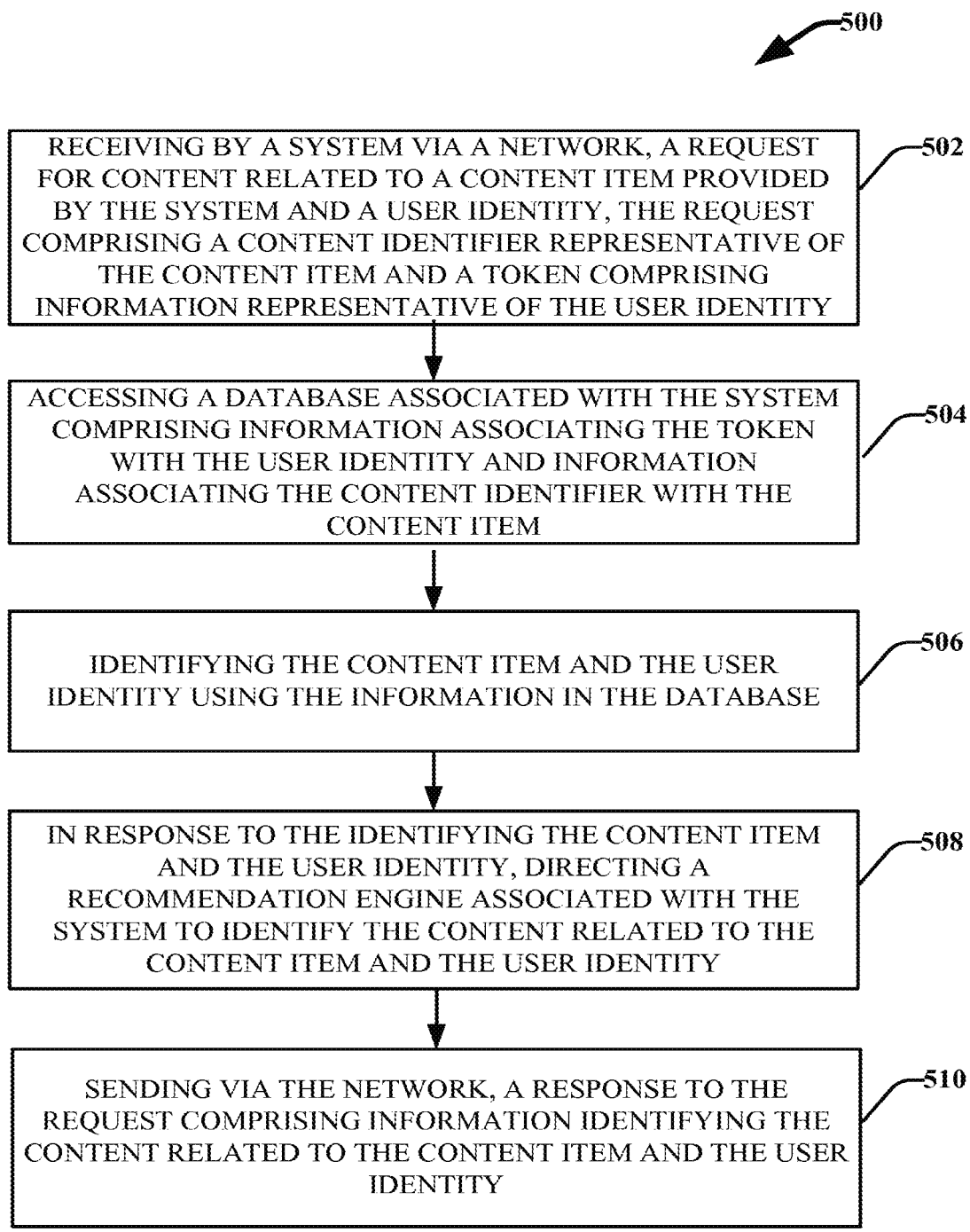
FIG. 5 presents an example method for using an API to provide information identifying personalized related content to third party applications in accordance with various aspects and embodiments described herein.
Figure 6:
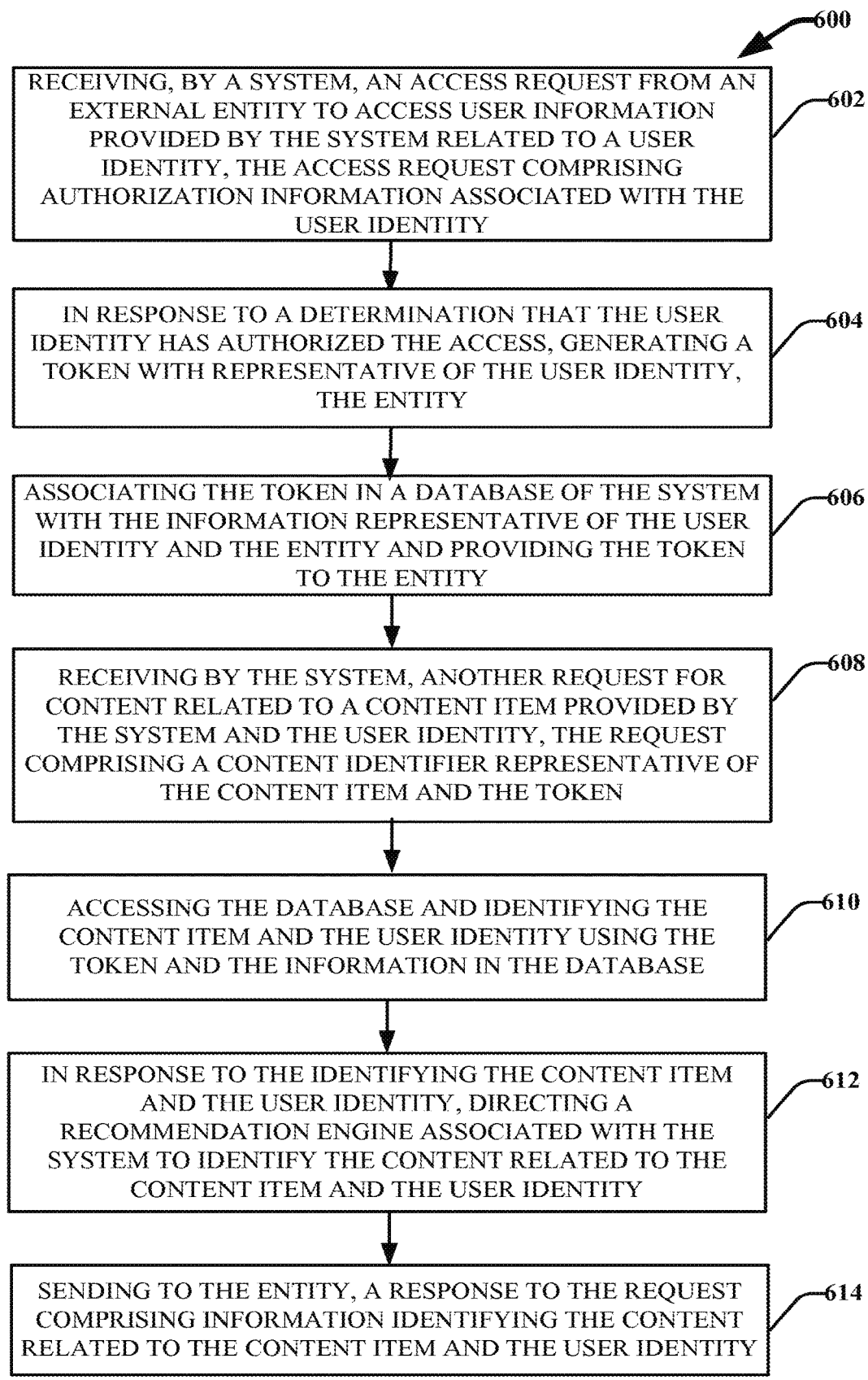
FIG. 6 presents another example method for using an API to provide information identifying personalized related content to third party applications in accordance with various aspects and embodiments described herein.
Figure 7:
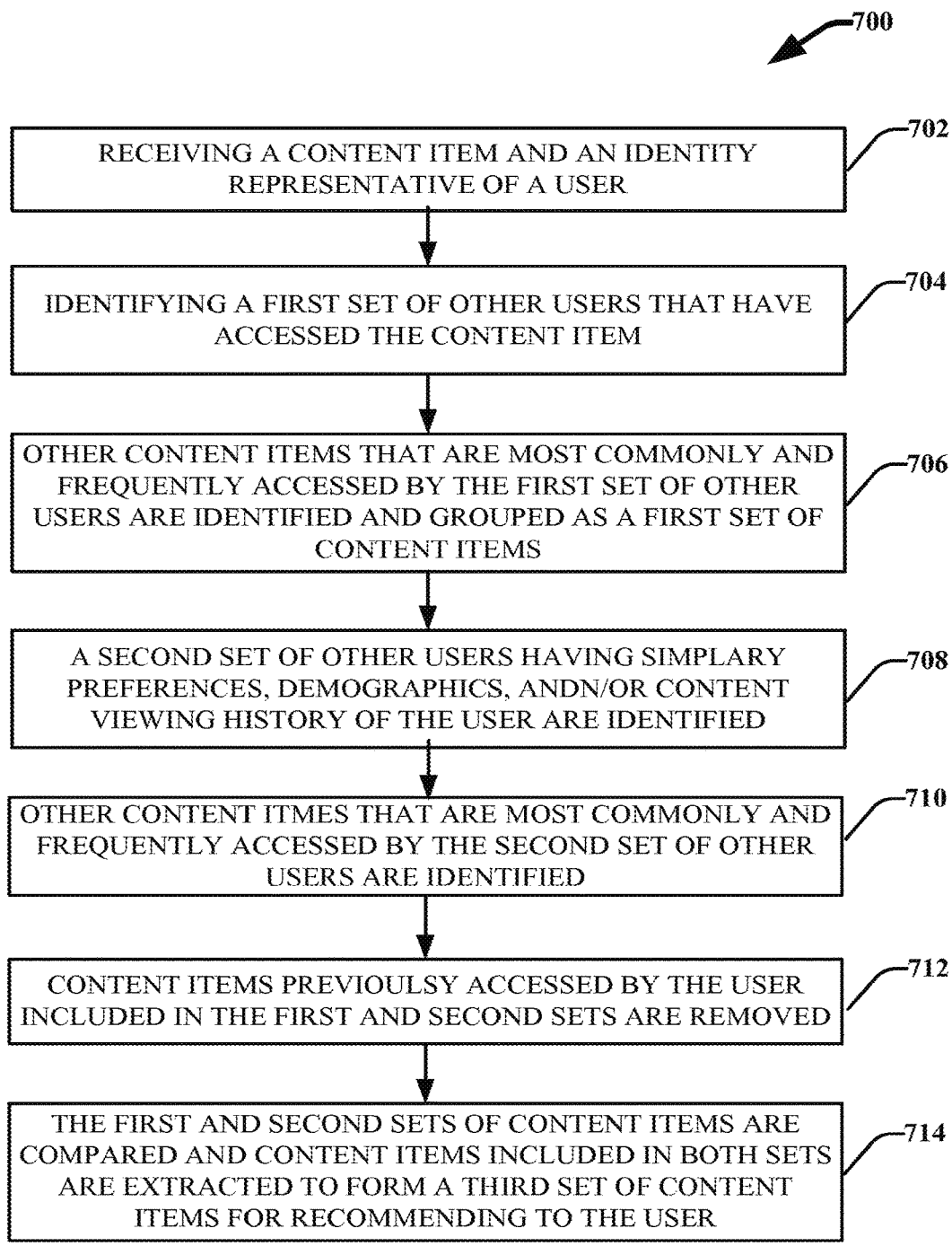
FIG. 7 presents an example method for recommending content related to a content item and a user identity associated with an API call in accordance with various aspects and embodiments described herein.

In view of the example systems and/or devices described herein, example methods that can be implemented in accordance with the disclosed subject matter can be further appreciated with reference to flowcharts in FIGS. 5-7. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 5 illustrates a flow chart of an example method 500 for using an API to provide, by a content provider, information to a third party application identifying content items, provided by the content provider, related to a content item and a user identified by the third party application, in accordance with aspects and embodiments described herein. At 502 a request is received by a system via a network (e.g., via API component 110) for content related to a content item provided by the system and a user identity. For example, the request can include a personalized related content API request for information identifying media items, provided by a media provider, that are related to another media item (e.g., a video identified in the request) and that are personalized for a particular user. The request includes at least a content identifier representative of the content item and a token with information representative of the user identity. At 504, a database associated with the system having information associating the token with the user identity and information associating the content identifier with the content item is accessed (e.g., using request processing component 114). At 506, the content item and the user identity are identified using the information in the database.

At 508, in response to the identifying the content item and the user identity, a recommendation engine associated with the system is directed (e.g., by request processing component 114) to identify the content related to the content item and the user identity. For example, where the content item identified in the request is a video, the recommendation engine can identify other videos related to the video and the user, and/or other channels or playlists having content related to the video and the user. For example, the recommendation engine can identify a set of media items related to the content item using various screening techniques (e.g., by identifying other media items accessed or endorsed by other users that accessed the video, by identifying other media items having related content to the video, by identifying other videos sharing similar features associated with the video, by identifying other videos associated with a similar genera of the video, etc.).

The recommendation engine can further filter this set of media items based on criteria associated with the user identity (e.g., user watch history, user preferences, user demographics, user social affiliations, etc.). For example, the recommendation can identify other users sharing similar preferences as the user and identify media items included in the set which the other users have accessed or endorsed. In another example, the recommendation engine can identify videos included in the set which are associated with channels, artists, or genres the user tends to prefer (e.g., based on user profile information and/or user watch history). At 510, a response to the request having information identifying the content related to the content item and the user identity is sent back to the requesting entity (e.g., using communication component 116).

FIG. 6 illustrates a flow chart of another example method 600 for using an API to provide, by a content provider, information to a third party application identifying content items, provided by the content provider, related to a content item and a user identified by the third party application, in accordance with aspects and embodiments described herein. At 602 a system receives an access request from an external entity to access user information provided by the system related to a user identity (e.g., by API component 110). The access request can include authorization information associated with the user identity. At 604, in response to a determination that the user has authorized the access, a token is generated by the system representative of the user identity and the entity. At 606, the token is associated in a database of the system with the information representative of the user identity and the entity the token in provided to the entity.

At 608 another request is received by a system (e.g., via API component 110) for content related to a content item provided by the system and the user identity. The request includes at least a content identifier representative of the content item and the token. At 610 the database is accessed and the content item and the user identity are identified using the token and the information in the database. At 612, in response to the identifying the content item and the user identity, a recommendation engine associated with the system is directed (e.g., by request processing component 114) to identify the content related to the content item and the user identity. At 614, a response to the request having information identifying the content related to the content item and the user identity is sent back to the requesting entity (e.g., using communication component 116).

FIG. 7 illustrates a flow chart of an example method 700 for of a recommendation engine for identifying content items related to another content item and a user identified in a personal related content request, in accordance with aspects and embodiments described herein. At 702, a content item and an identity representative of a user are received. At 704, a first set of other users that have accessed a content item are identified. For example, where the content item is video, other users that have viewed the video can be identified. At 706, other content items that are most commonly and frequently viewed by the first set of other users are identified and grouped as a first set of content items. For example, videos which two or more of the others users have viewed can be identified and ranked based on the number of the other users that have viewed the videos and the number of times the videos where viewed. At 708, a second set of other users having similar preferences, demographics, and/or content viewing history of the user are identified. At 710, other content items that are most commonly and frequently viewed by the second set of other users are identified and grouped as a second set of content items. At 712, content items previously accessed by the user included in the first and second sets are removed. At 714, the first and second sets of content items are compared and content items included in both sets are extracted to form a third set of content items for recommending to the user.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 8:
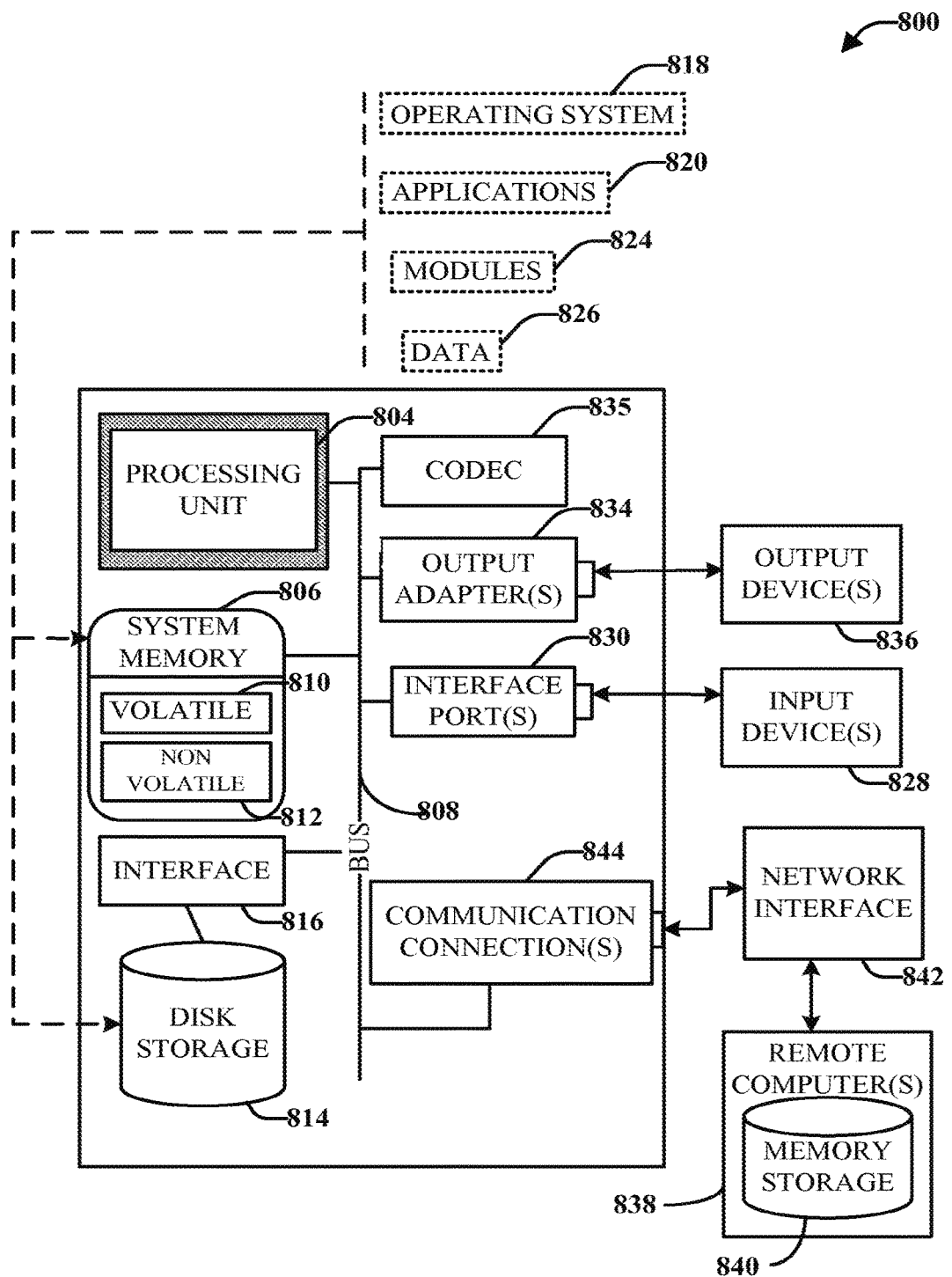
FIG. 8 is a schematic block diagram illustrating a suitable operating environment in accordance with various aspects and embodiments.

With reference to FIG. 8, a suitable environment 800 for implementing various aspects of the claimed subject matter includes a computer 802. The computer 802 includes a processing unit 804, a system memory 806, a codec 805, and a system bus 808. The system bus 808 couples system components including, but not limited to, the system memory 806 to the processing unit 804. The processing unit 804 can be any of various available suitable processors. Dual microprocessors and other multiprocessor architectures also can be employed as the processing unit 804.

The system bus 808 can be any of several types of suitable bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 884), and Small Computer Systems Interface (SCSI).

The system memory 806 includes volatile memory 810 and non-volatile memory 812. The basic input/output system (BIOS), containing the basic routines to transfer information between elements within the computer 802, such as during start-up, is stored in non-volatile memory 812. In addition, according to present innovations, codec 805 may include at least one of an encoder or decoder, wherein the at least one of an encoder or decoder may consist of hardware, a combination of hardware and software, or software. Although, codec 805 is depicted as a separate component, codec 805 may be contained within non-volatile memory 812. By way of illustration, and not limitation, non-volatile memory 812 can include read only memory (ROM), programmable ROM (PROM), electrically programmable ROM (EPROM), electrically erasable programmable ROM (EEPROM), or flash memory. Volatile memory 810 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 802 may also include removable/non-removable, volatile/non-volatile computer storage medium. FIG. 8 illustrates, for example, disk storage 814. Disk storage 814 includes, but is not limited to, devices like a magnetic disk drive, solid state disk (SSD) floppy disk drive, tape drive, Jaz drive, Zip drive, LS-70 drive, flash memory card, or memory stick. In addition, disk storage 814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816.

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s). Thus, for example, a USB port may be used to provide input to computer 802, and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

Figure 9:
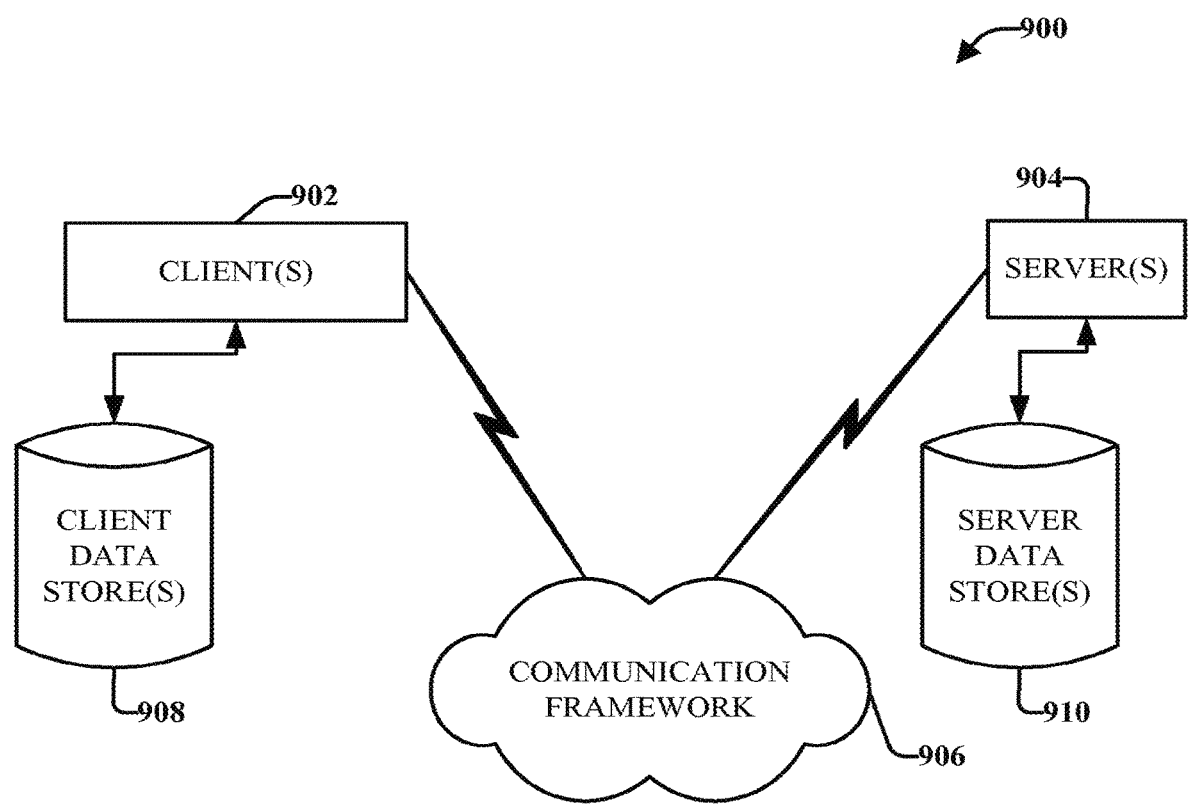
FIG. 9 is a schematic block diagram of a sample-computing environment in accordance with various aspects and embodiments.

Referring now to FIG. 9, there is illustrated a schematic block diagram of a computing environment 900 in accordance with this disclosure. The system 900 includes one or more client(s) 902 (e.g., laptops, smart phones, PDAs, media players, computers, portable electronic devices, tablets, and the like). The client(s) 902 can be hardware and/or software (e.g., threads, processes, computing devices). The system 900 also includes one or more server(s) 904. The server(s) 904 can also be hardware or hardware in combination with software (e.g., threads, processes, computing devices). The servers 904 can house threads to perform transformations by employing aspects of this disclosure, for example. One possible communication between a client 902 and a server 904 can be in the form of a data packet transmitted between two or more computer processes wherein the data packet may include video data. The data packet can include a metadata, e.g., associated contextual information, for example. The system 900 includes a communication framework 906 (e.g., a global communication network such as the Internet, or mobile network(s)) that can be employed to facilitate communications between the client(s) 902 and the server(s) 904.

Communications can be facilitated via a wired (including optical fiber) and/or wireless technology. The client(s) 902 include or are operatively connected to one or more client data store(s) 908 that can be employed to store information local to the client(s) 902 (e.g., associated contextual information). Similarly, the server(s) 904 are operatively include or are operatively connected to one or more server data store(s) 910 that can be employed to store information local to the servers 904.

In one embodiment, a client 902 can transfer an encoded file, in accordance with the disclosed subject matter, to server 904. Server 904 can store the file, decode the file, or transmit the file to another client 902. It is to be appreciated, that a client 902 can also transfer uncompressed file to a server 904 and server 904 can compress the file in accordance with the disclosed subject matter. Likewise, server 904 can encode video information and transmit the information via communication framework 906 to one or more clients 902.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A method for providing related content, the method comprising:
    receiving, at a server associated with a content provider system from an application, a request for content related to a content item hosted by the content provider system, wherein the request includes a content identifier corresponding to the content item and a token that represents a pairing of an application identifier of the application providing the request and a user identifier;
    identifying, at the server associated with the content provider system, the application identifier and the user identifier represented by the token;
    determining whether the application is authorized to provide the request for content based on the application identifier;
    in response to determining that the application is authorized to provide the request, generating a list of related content items based on the content identifier and the token;
    modifying the list of related content items by removing, from the list of related content items, previously consumed content items associated with the user identifier; and
    transmitting the modified list of related content items in response to the request.

2. The method of claim 1, further comprising generating authorization information in response to determining that the application is authorized to provide the request.

3. The method of claim 2, further comprising associating the authorization information with the token in response to determining that the application is authorized to provide the request.

4. The method of claim 2, further comprising disassociating the authorization information with the token in response to determining that the application is not authorized to provide the request.

5. The method of claim 1, wherein the determination that the application is authorized to provide the request is based on previously stored authorization information for the application and the user identifier.

6. The method of claim 1, wherein the request further comprises a key and wherein the determination that the application is authorized to provide the request for content is based on a verification of the key.

7. The method of claim 1, wherein the token further comprises session information that associates the token with a session between the application and a content provider system.

8. A system for providing related content items, the system comprising:
    a hardware processor of a server associated with a content provider system that:
        receives, from an application, a request for content related to a content item hosted by the content provider system, wherein the request includes a content identifier corresponding of the content item and a token that represents a pairing of an application identifier to the application providing the request and a user identifier;
        identifies, at the server associated with the content provider system, the application identifier and the user identifier represented by the token;
        determines whether the application is authorized to provide the request for content based on the application identifier;
        in response to determining that the application is authorized to provide the request, generates a list of related content items based on the content identifier and the token;
        modifies the list of related content items by removing, from the list of related content items, previously consumed content items associated with the user identifier; and transmits the modified list of related content items in response to the request.

9. The system of claim 8, wherein the hardware processor is further configured to generate authorization information in response to determining that the application is authorized to provide the request.

10. The system of claim 9, wherein the hardware processor is further configured to associate the authorization information with the token in response to determining that the application is authorized to provide the request.

11. The system of claim 9, wherein the hardware processor is further configured to disassociate the authorization information with the token in response to determining that the application is not authorized to provide the request.

12. The system of claim 8, wherein the determination that the application is authorized to provide the request is based on previously stored authorization information for the application and the user identifier.

13. The system of claim 8, wherein the request further comprises a key and wherein the determination that the application is authorized to provide the request for content is based on a verification of the key.

14. The system of claim 8, wherein the token further comprises session information that associates the token with a session between the application and a content provider system.

15. A non-transitory computer-readable medium containing computer-executable instructions that, when executed by a hardware processor, cause the hardware processor to perform a method for providing related content items, the method comprising:
receiving, at a server associated with a content provider system from an application, a request for content related to a content item hosted by the content provider system, wherein the request includes a content identifier corresponding to the content item and a token that represents a pairing of an application identifier of the application providing the request and a user identifier;
identifying, at the server associated with the content provider system, the application identifier and the user identifier represented by the token;
determining whether the application is authorized to provide the request for content based on the application identifier;
in response to determining that the application is authorized to provide the request, generating a list of related content items based on the content identifier and the token;
modifying the list of related content items by removing, from the list of related content items, previously consumed content items associated with the user identifier; and
transmitting the modified list of related content items in response to the request.

16. The non-transitory computer-readable medium of claim 15, wherein the method further comprises generating authorization information in response to determining that the application is authorized to provide the request.

17. The non-transitory computer-readable medium of claim 16, wherein the method further comprises associating the authorization information with the token in response to determining that the application is authorized to provide the request.

18. The non-transitory computer-readable medium of claim 16, wherein the method further comprises disassociating the authorization information with the token in response to determining that the application is not authorized to provide the request.

19. The non-transitory computer-readable medium of claim 15, wherein the determination that the application is authorized to provide the request is based on previously stored authorization information for the application and the user identifier.

20. The non-transitory computer-readable medium of claim 15, wherein the request further comprises a key and wherein the determination that the application is authorized to provide the request for content is based on a verification of the key.

21. The non-transitory computer-readable medium of claim 15, wherein the token further comprises session information that associates the token with a session between the application and a content provider system.

* * * * *